Oct. 8, 1929.  E. J. SIBLEY  1,730,538
CASEMENT WINDOW FRICTION ADJUSTER
Filed Sept. 22, 1925  3 Sheets-Sheet 1
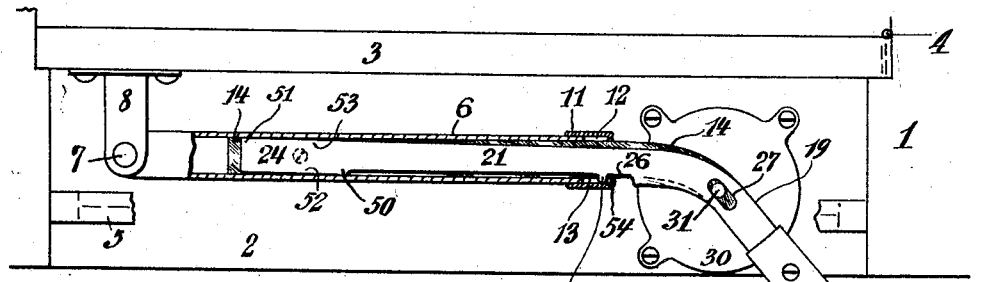
Fig. 1
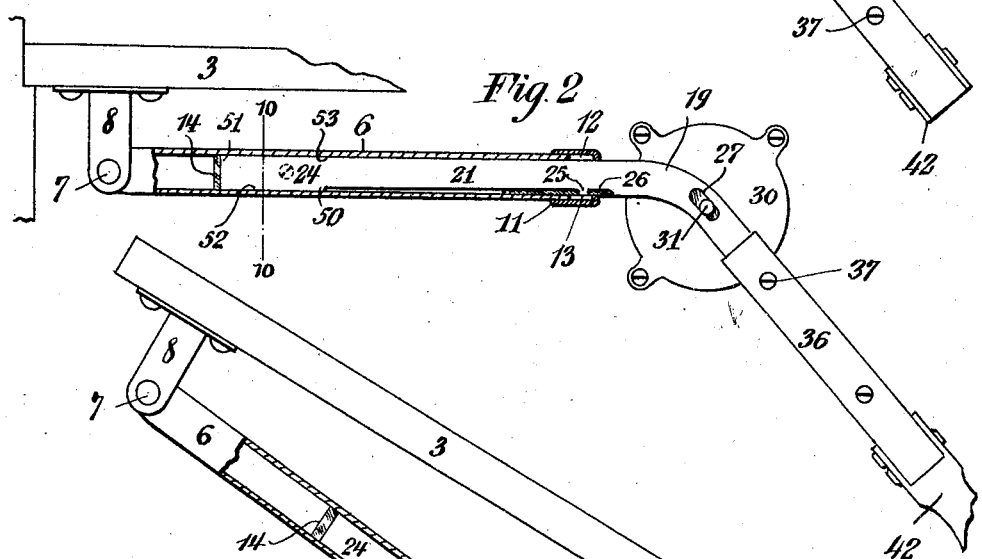
Fig. 2
Fig. 3
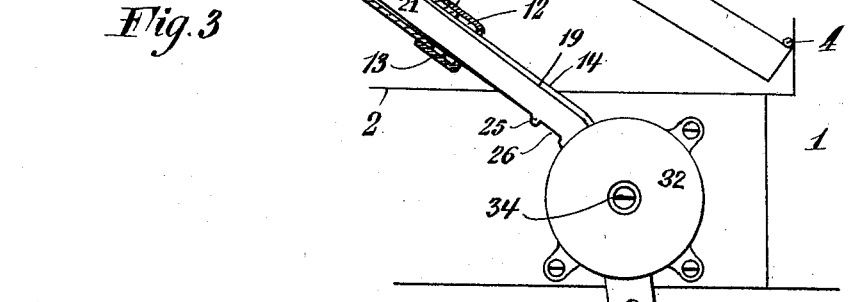
Inventor
Edwin J. Sibley
By his Attorney
Ivan E. A. Konigsberg Oct. 8, 1929.  E. J. SIBLEY  1,730,538
CASEMENT WINDOW FRICTION ADJUSTER
Filed Sept. 22, 1925  3 Sheets-Sheet 2
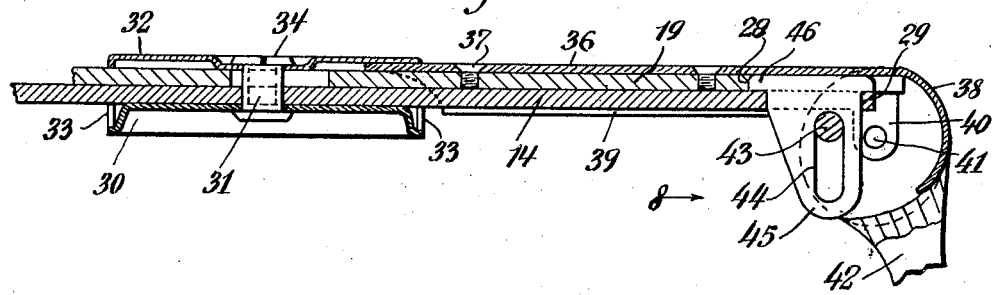
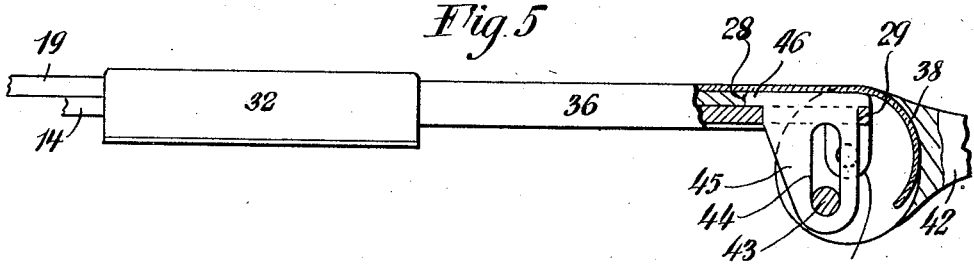
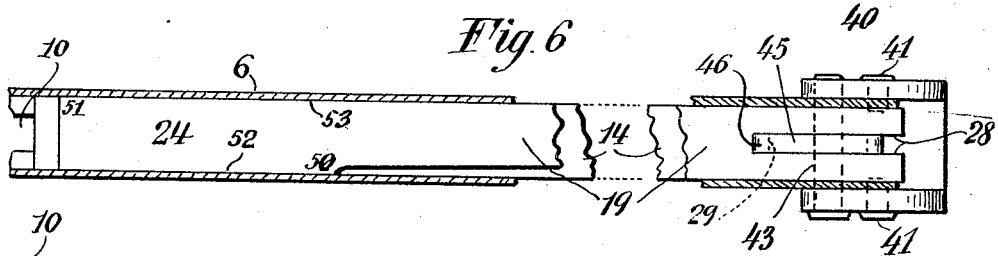
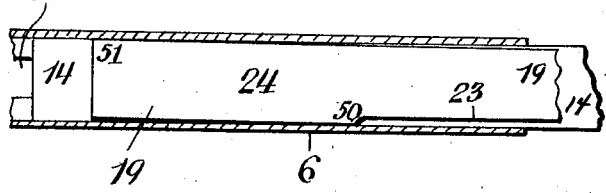
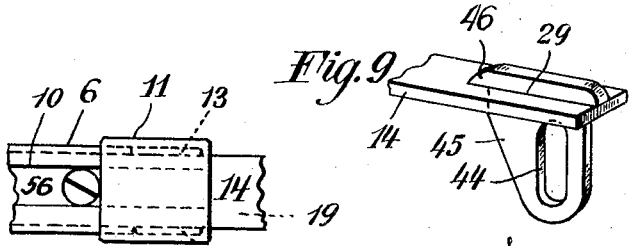
Edwin J. Sibley, Inventor
By his Attorney
Ivan E. A. Konigsberg Oct. 8, 1929.  E. J. SIBLEY  1,730,538
CASEMENT WINDOW FRICTION ADJUSTER
Filed Sept. 22, 1925   3 Sheets-Sheet 3
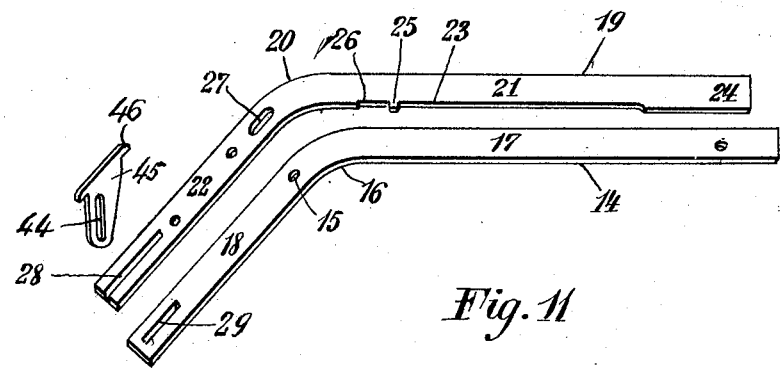
Fig. 11
Fig. 12
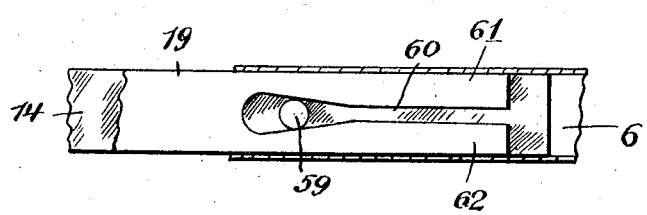
Fig. 13
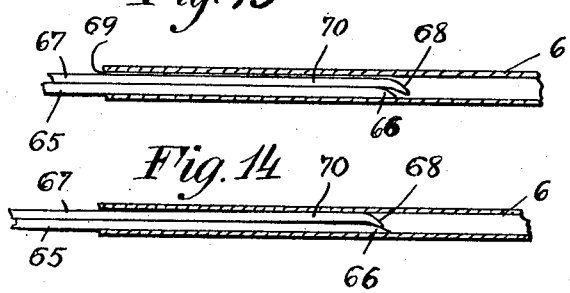
Fig. 14
Fig. 15
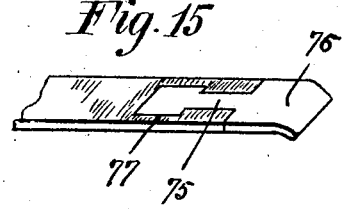
Edwin J. Sibley  Inventor
By his Attorney
Ivan E. A. Konigsberg Patented Oct. 8, 1929

1,730,538

UNITED STATES PATENT OFFICE

EDWIN J. SIBLEY, OF WESTBURY, NEW YORK

CASEMENT WINDOW FRICTION ADJUSTER

Application filed September 22, 1925. Serial No. 57,831.

This invention relates to improvements in casement window friction adjusters.

The broad object of the invention is to provide an adjuster in which the friction is obtained by novel means operating more in the nature of a clutch mechanism and characterized by that separate and distinct friction elements are elimnated.

The invention is embodied in an adjuster comprising a tubular member secured to the window and a pair of clutching members supported on the window sill and adapted to slide within the tube. When it is desired to hold the window in open position, the clutching members are operated to clutch themselves within and to the tube as it were.

This invention distinguishes over the art in that separate and distinct friction elements, such for instance, as are disclosed in my pending application for U. S. Patent, filed October 18, 1924, Serial Number 744,388, are dispensed with, and replaced by a clutching mechanism. The latter term, however, is not used in any limiting sense, but solely to emphasize the absence of separate friction elements and as a matter of convenience in describing the invention.

Other objects of the invention is to provide an adjuster embodying the main feature as aforesaid and adapted to be reversed to be used in connection with a window hung either left or right. Also to provide an adjuster particularly well adapted to be oprated through a window screen.

Other objects will appear as this specification proceeds.

The invention will be more fully understood from the following specification read in connection with the accompanying drawings in which Figure 1 is a plan view, partly in section, of a casement window adjuster embodying my invention and showing the adjuster in locked position.

Figure 2 is a similar view with parts broken away, showing the adjuster with the clutch mechanism released.

Figure 3 is a view showing the adjuster in position with the window opened and the clutch mechanism locked.

Figure 4 is a longitudinal sectional view of the clutch operating means in locked position.

Figure 5 is a similar view showing the parts in released position.

Figure 6 is a plan view with parts broken away showing the parts in locked position corresponding to Figure 4.

Figure 7 is a view similar to Figure 6 showing the parts in position corresponding to Figure 5.

Figure 8 is a transverse view of the parts shown in Figure 4 looking in the direction of arrow 8.

Figure 9 is a detail view of a detachable cam used in operating the adjuster.

Figure 10 is a transverse sectional view on line 10—10 of Figure 2.

Figure 11 is a detail view of certain parts illustrating how the adjuster may be changed to operate a window hung at either the right or the left side thereof.

Figure 12 is a detail view showing a modification of the clutching means.

Figures 13, 14 and 15 are detail views of a still further modification.

Referring to the drawings the reference numeral 1 denotes a window frame, 2 is the stool, 3 the window hinged at 4 and 5 represents the window screen or intervening member. These parts are shown conventionally.

The adjuster comprises a tube 6 preferably of rectangular cross section. It is pivoted at 7 to a bracket 8 suitably secured to the free end or side of the window. As seen in Figure 10 the tube has an open bottom providing a slot 10. The inner end of the tube carries a collar 11 which encloses the tube. Within the collar the tube is cut away at opposite sides to form slots 12 and 13.

The clutch mechanism comprises a relatively fixed clutch base 14 which has a pivot hole 15 and which is bent as at 16 to form an adjuster operating portion 17 and a handle portion 18 which is provided with a slot 29.

The reference numeral 19 denotes a relatively movable clutch lever which is bent at 20 to form a clutch arm 21 and a handle portion 22. The clutch arm is cut away as at 23 to form a clutch head 24 and a locking tooth 25 beyond which the cut away portion is continued to form a recess 26.

The handle portion 22 of the clutch arm is provided with a slot 27 and a recess 28.

The clutch base 14 and the clutch lever 19 are arranged to telescope within the tube 6 and to slide therein relative to one another. The clutch base 14 occupies the full width of the tube throughout its length, while in the case of the clutching lever 19 only the clutch head 24 has its sides parallel and of practically the same width as the inside of the tube. Both members have a sliding fit within the tube.

The numeral 30 denotes a suitable support or base which carries a fixed pivot 31. The base is fixed to the window sill or stool 3. The members 14 and 19 are pivoted on the pivot 31 by means of the aforesaid pivot hole 15 and slot 27 in the two members respectively. A casing 32, Figure 4 fits over the base 30 to cover the parts therein and is cut out as at 33, 33 to permit the members 14 and 19 to pass therethrough. A screw 34 in the pivot 31 secures the members 14 and 19 and the casing 32 in position without clamping said members as is obvious.

The clutch members extend to both sides of the pivot 31. The inner end of the member 19 carries a channel guide 36 secured by screws 37. The guide forms a shield 38 and is wrapped around the lower member 14. The bottom of the channel 36 forms a slot or guideway 39, see Figure 8. The channel also has two depending lugs 40 in which is pivoted at 41 a drop handle 42. The handle carries a detachable pin 43 which passes through a slot 44 in a cam 45, which latter is seated in the closed slot 29 of the clutch base 14 and which cam also lies within the recess 28 in the clutch arm 19, and has a nose 46 which rests on said clutch arm 19.

The arrangement is such, and Figures 4 and 5 clearly show, that when the handle 42 is dropped as in Figure 4, the clutch arm, the upper member, is moved rearwardly or to the right in the drawing. When the handle 42 is raised as in Figure 5, the member 19 is moved to the left in the drawing. The relative sliding movement of the clutch arm 19 on the base 14 is effected by the movement of the handle which in turn moves the pin 43 in the cam slot 44. Inasmuch as the cam cannot move in the base 14, the result is that the handle is moved laterally as well as swung up or down, and the channel 36 to which the handle is secured is forced to slide one way or the other, thereby moving the clutch lever 19.

The normal clutched position of the parts of the adjuster is as shown in Figures 1, 4 and 6, where it will be observed that the clutch lever 19 is in its extreme position to the right in the drawing, whereby the clutch head 24 is jammed or clamped tightly against the sides of the tube 6. The clutching or pinching action of the clutch head takes place theoretically at the points 50 and 51, because in moving the clutch lever to the right, by sliding its slot 27 on the pivot 31, the lever has been moved obliquely within the tube and has been moved laterally so that the sides of the head 24 are no longer parallel to the sides of the tube. Practically, however, the sides or edges 52 and 53 of the clutch head 24 engage the sides of the tube for some distance from the said points 50 and 51. It follows that when the window is closed, as in Figure 1, or when the window is in any open position within its range of movement, see Figure 3, the window is fastened when the handle 42 is dropped to apply the clutch.

In operation the adjuster is preferably mounted as shown in Figure 1, close to the window and the pivot 31 is generally located in the plane of the screen which is cut out to provide room for the base 30 and the casing 32. The adjuster is then operated to open or close the window by raising the handle 42, then moving the window to desired position, as in Figure 3, then dropping the handle again to apply the clutch to hold the window. When the dropped handle is raised, the clutch lever slides obliquely within the tube 6 because of the bend in the lever at 20, hence said lever is shaped, as shown, to permit such oblique movement, in that the edge 23 is cut away or sloped from the clutch head 24 toward the pivot 31.

As seen in Figure 1, when the window is closed and the handle is dropped, the tooth 25 is automatically moved into the tube slot 13 due to the oblique rightward movement of the clutch lever 19 (in a downward and rightward direction on the drawing). In this position, therefore, not only is the window and the adjuster clutched together and secured, but the window is mechanically locked because any attempt to open the window by pulling at its free edge causes a longitudinal pull on the tube 6, which pull is resisted by the inturned edge 54 of the collar 11, and the window cannot be opened until the handle 42 is raised, as in Figure 2, when the tooth 25 is automatically released from engagement with the tube 6 and the clutch lever is free to slide because the edges 52 and 53 of said lever are now parallel with the sides of the tube as is obvious.

Another feature of importance, and as illustrated in Figure 10, which shows that the members 14 and 19 cannot be removed from the barrel without first removing a screw 56 which is screwed into the member 14. Were there nothing to stop the outward sliding movement of the tube 6 and collar 12, the two telescopic parts of the adjuster might become detached and the device would become useless, because the barrel is attached to the window on one side of the screen while the clutch members are carried on the base on the other side of the screen and thus there would be no means of holding the window.

It is a matter of general knowledge that windows are hung at either their left side or right side depending upon local conditions, and it is therefore apparent that an adjuster must be arranged to operate correspondingly. To meet this requirement, adjusters have heretofore usually been made "right" or "left" and thus sold and carried in stock. It is an obvious advantage to provide an adjuster which may be made in only one pattern changeable from right to left as may be desired. It is a feature of my invention to provide means whereby such change may be effected.

Figure 11 illustrates a "left" adjuster embodying my invention and which is produced by merely changing certain parts in the "right" adjuster shown in Figure 1. It will be apparent that the change cannot be effected by merely detaching the friction members from the tube and turning them over, because to do so would reverse all the parts of the adjuster within the screen and this cannot be done. I have therefore, provided means for detaching the parts in such a manner that certain of them may be reversed to accomplish the object sought, yet the appearance and operation of the adjuster remain the same.

In changing from a right to a left adjuster or vice versa, the pivot screw 34 is removed, the casing 32 lifted off and the adjuster separated from the base. Next the stop screw 56 is removed and the tube 6 detached from the members 14 and 19. The handle 42 is removed by taking out the pin 43 and the screws 37 in the channel 36, which then slides off the members 14 and 19. Next the cam 45 is taken out. Now the three members 14, 19 and 45 are separated and the members 14 and 19 are turned over, as shown in Figure 11. Thereafter the parts are assembled irrespective of the right or left position of the adjuster. The cam 45 is placed in position, as in Figure 4, the channel guide 36 is slid on to the two members 14 and 19 and secured by the screws 37, and the pin 43 is put through the holes in the handle and the slot 44 in the cam. At this stage the inner end of the adjuster is now precisely the same as in Figure 4, but the adjuster has been changed from left to right. The stop screw 56 is replaced, the adjuster is mounted on the base and completed as in Figure 4.

The assembled left adjuster in Figure 11 operates exactly like the right adjuster in Figure 1, except that the tooth 25 now enters the slot 12 in the collar 11 and instead of entering the slot 13 as before. The bracket 8 is, of course, swung 180° around the pivot 7 to correspond with the reversed position of the adjuster. Only a screw driver is needed to make the change and it takes but a few minutes to do so.

The fact that the cam 45 is detachable and reversible is one of the main features making the change possible. The nose 46 on the cam is useful in preventing binding of the parts when the handle is operated, in that it extends the upper surface of the cam against the underside of the channel 36. It also provides a necessary overhanging portion on the clutch base 14. The stop screw 56, is of course, reversible in that it may be screwed to the clutch base 14 on either side.

It should be noticed that the point at which the force is applied to operate the window remains unchanged, namely, at the bracket pivot 7. This construction, therefore, embodies the correct principle in operating a window, namely, that of applying the pressure at the extreme free end of the member to be moved or swung.

Referring to Figure 12 the base lever 14 may be provided with a screw or abutment 59 which projects upwardly within a fish tail formed slot 60 in the clutch lever 19. In this case when the handle 42 is dropped, the clutch lever 19 is moved to the left in Figure 12, and the sides of the slot 60 ride on and against the abutment 59 which tends to expand said slot and force the portions 61 and 62 against the sides of the tube into clutching relation therewith. When the drop handle is raised the clutch lever 19 is moved into the position shown in Figure 12, where the portions 61 and 62 lie parallel to the sides of the tube 6 and the members are in non-clutching position.

Referring to Figures 13 and 14 the clutch base member 65 is provided with a rounded end 66, and the clutch 67 is provided with a cam portion 68. When the adjuster is unclutched, the parts are in the position shown in Figure 13 and free to slide in the tube 6, the open space 69 indicating the freedom of movement of the two clutch members within the tube.

When the drop handle is operated to lock the adjuster, the clutch lever 67 is moved in precisely the same manner as the lever 19 above and the cam portion 68 rides up on the rounded end 66 as shown and the end portion 70 of the clutch lever is pinched between the base and the tube and clutched to the latter.

For purposes of reversibility the clutch lever may have a detachable cam piece 75, Figure 15, having a cam 76 and fitted within a cut out 77 in the lever so that the cam piece may be lifted off, when the clutch lever is turned over as in Figure 11 to reverse the adjuster.

It has been found in practise that it is possible by properly designing the parts to clutch or jam the clutch head 24 within the tube 6 to such an extent that it is practically impossible to telescope the adjuster when the clutch is on, and that this construction, therefore, provides a very much stronger grip on the window than that which can be obtained when intervening friction elements are employed. It is also obvious that the manufacturing cost is greatly reduced and the assembling of the parts may be done more rapidly. In practise the parts are so designed that the clutch will yield or rather that the tube 6 may slide on the clutch head in the event that an abnormally strong pressure is exerted on the window, thereby avoiding breakage which otherwise would take place were it physically impossible to slide the tube on the clutch head after the clutch is on.

While my invention has been disclosed in its preferred form, nevertheless, I do not wish to be limited to the exact details shown as changes and modifications may readily be made without departing from the spirit of invention or the scope of the appended claims.

I claim:—

1. A casement window adjuster comprising a tube, a pair of superposed levers at least one of which is slidably held within the tube, an integral clutching portion on the said one lever operable upon a relative sliding movement between the said two levers to move said clutching portion into clutching relation with the tube and a handle for sliding one lever upon the other lever.

2. A casement window adjuster comprising a pivotal support, a pair of levers mounted thereon, a tube slidably carried by said levers, a clutching portion formed integrally with one of said levers, a handle pivoted to the other lever for moving the said clutching portion into clutching relation with the said tube and for swinging the said adjuster on said pivotal support.

3. A casement window adjuster comprising a support, a lever pivoted thereon, a tube slidably mounted on said lever, a locking tooth on said lever adapted to enter a notch in the tube and means for sliding the lever on said pivotal support into clutching engagement with the tube and cause said locking tooth to engage said notch to lock the lever within the tube.

4. A casement window adjuster comprising a support, a pair of levers mounted thereon, a tube slidably mounted on said levers, an abutment in one of said levers, a slot in the other of said levers and means for operating the said other lever to expand the said slot by contact with the said abutment whereby the said other lever is brought into clutching engagement with the said tube.

EDWIN J. SIBLEY.